Patented Sept. 3, 1940

2,213,415

UNITED STATES PATENT OFFICE 2,213,415

METHOD OF PRODUCING A MIXTURE OF HYDROCARBONS

Eulampiu Slatineanu, Oberhausen, Germany, assignor to Gewerkschaft Auguste, Oberhausen, Germany, a German company No Drawing. Application December 15, 1936, Serial No. 115,949. In Germany December 23, 1935

4 Claims. (Cl. 260—449)

My invention relates to the production mixtures of hydrocarbons and more particularly to a method which renders it possible to carry through on an industrial scale reactions of a strongly endothermic character, which hitherto forbade their large-scale utilization, between gases or between gases and liquids.

The invention is quite especially concerned with the production of valuable hydrocarbons from methane and the oxides of carbon.

I have found that strongly endothermic reactions can be held under control and utilized in the production of hydrocarbons by causing a reaction of exothermic character, such as for instance the reaction $$CO + 3H_2 = CH_4 + H_2O \qquad (a)$$

(which shall be termed hereinafter "steering reactions"), to occur simultaneously, thereby steering the algebraic sum of the free energies of the two reactions into thermodynamically favorable regions. I thus succeed in obtaining the final products of reactions, which, owing to the particular thermic conditions, i. e. owing to their highly endothermic character, could hitherto be carried through on an industrial scale, if at all, only with great difficulty.

The free energies are the measure of the course of a reaction. According to this invention their algebraic sum must not exceed the value of $+5500$ gram/calories per mol of hydrocarbon produced (calculated according to the method disclosed by Lewis and Randall, for instance in "Thermodynamik und die freie Energie" published by Julius Springer, Vienna 1927). This sum may also represent a negative value, the notation adopted by Lewis and Randall being used.

The control of the free energies achieved by this rule of working offers the great advantage of allowing the reactions to be carried through under high pressure. High pressure is a necessity because under normal pressure the methane molecule is very stable and does not readily enter into any reaction.

A sufficiently high pressure activates (polarizes) the methane molecule, which then forms a readily reactive compound. According to the law of mass action the high pressure also acts towards increasing the yield, so that we are now enabled to carry through successfully even such reactions which possess a comparatively small physico-chemical constant K and accordingly also only a low negative or even a positive free energy (not exceeding 5500 g./cal.). Apart therefrom the high pressure offers the further advantage of highly accelerating the reaction.

I have found that in this manner I can produce hydrocarbons (or their polymerics or isomerics) which may carry side chains, from mixtures of carbon monoxide, which in such mixture may be wholly or partly replaced by carbon dioxide, and hydrogen, which may wholly or partly be replaced by water, with methane, being enabled to so influence the reaction that either aliphatic or hydroaromatic or aromatic hydrocarbons predominate in the product of the process.

My invention shall first be explained more in detail with reference to the synthetical production under pressure of the (aliphatic) octan. The process is here carried through in such manner that in the fundamental reaction equation $$17CH_4 + 7CO = 3C_8H_{18} + 7H_2O$$

which, being strongly endothermic, can be utilized as such, if at all, only with great difficulty, part of the methane is replaced, by way of the steering reaction (a), by a mixture of hydrogen and carbonmonoxide in the molecular proportion of $3H_2$ to $1CO$. $H_2$ and $CO$ are gradually introduced into the endothermic fundamental reaction equation until a reaction equation has been reached, the free energy of which remains below $+5500$ g./cal. per mol octan. By introducing $H_2$ and $CO$ in the molecular proportion mentioned above we thus steer the process from the thermodynamically infavorable region into a region which under high pressure conditions is thermodynamically favorable.

If the whole of the $CH_4$ to be introduced in accordance with the ground reaction $$17CH_4 + 7CO = 3C_8H_{18} + 7H_2O$$

were repaced by a mixture of 3 parts $H_2$ and 1 part $CO$, there would result the equation $$17H_2 + 8CO = C_8H_{18} + 8H_2O \text{ (end reaction equation)}$$

which at technically favorable temperatures is so strongly exothermic that it cannot be controlled. Even if this reaction were carried through under vigorous cooling, inevitable local overheating would lead to a decomposition of the hydrocarbon to be produced and to the formation of methane as an undesired by-product. The technical difficulties which oppose themselves to a sufficiently rapid abduction of the great quantities of heat developed, are felt quite particularly when operating under high pressure, since in this case the heat is developed in a smaller space and leads to a more rapid and more accentuated rise of temperature. I thus avoid reactions, which, under the conditions of operation chosen, are strongly exothermic. In the production of octan for instance such reactions are preferably elected in which the free energies lie below $+5500$ and between $+5500$ and $-10000$ g./cal. per mol octan produced.

Between the fundamental reaction equation and the end reaction equation mentioned above a great number of different reaction equations can be formed by replacing any fraction of the quantity of methane, which is required according to the fundamental reaction equation, by the corresponding quantity of a mixture of $3H_2+CO$. The free energies of these intermediate equations lie between the free energy of the fundamental reaction and that of the end reaction. They are determined in a well known manner, and the starting materials are brought together in those molecular proportions which correspond to an intermediate reaction, the free energy of which at the working temperature does not exceed the value of $+5500$ g./cal. per mol octan, and may thus also be negative. It is advisable to start from gas mixtures which under the pressure and at the temperature used will not develop any nor too large quantities of heat, for instance mixtures which correspond to the following equations:

$$11CH_4+13CO+18H_2=3C_8H_{18}+13H_2O$$
$$\begin{pmatrix}-1056 \text{ g./cal. per mol } C_8H_{18} \text{ at } 550° \text{ absol.;}\\+5037 \text{ g./cal. per mol } C_8H_{18} \text{ at } 575° \text{ absol.}\end{pmatrix}$$

or:

$$10CH_4+14CO+21H_2=3C_8H_{18}+14H_2O$$
$$\begin{pmatrix}-7573 \text{ g./cal. per mol } C_8H_{18} \text{ at } 550° \text{ absol.;}\\-989 \text{ g./cal. per mol } C_8H_{18} \text{ at } 575° \text{ absol.}\end{pmatrix}$$

or:

$$9CH_4+15CO+24H_2=3C_8H_{18}+15H_2O$$
$$\begin{pmatrix}-14091 \text{ g./cal. per mol } C_8H_{18} \text{ at } 550° \text{ absol.;}\\-7015 \text{ g./cal. per mol } C_8H_{18} \text{ at } 575° \text{ absol.}\end{pmatrix}$$

The figures indicate the approximate values of the free energies at 550° and 575° absol. (degrees Kelvin), respectively. According to the two first equations it is preferable to work at 550° absol., according to the two last mentioned equations at 575° absol.

The synthetic production of octan according to the fundamental equation $$17CH_4+7CO=3C_8H_{18}+7H_2O$$

can also be steered or directed with the aid of the reaction:

$$2H_2O+4CO=CH_4+3CO_2 \quad (b)$$

The strongly exothermic end reaction then reads $$9H_2O+25CO=C_8H_{18}+17CO_2$$

Again the free energies of the intermediate stages are determined and a suitable stage is elected for the practical operation according to the principles developed above.

In the production of octan one may also start from the fundamental reaction equations $$9CH_4+14CO=2C_8H_{18}+7CO_2$$

or $$25CH_4+7CO_2=4C_8H_{18}+14H_2O$$

Besides the steering reactions ($a$) and ($b$) mentioned above we may also avail ourselves of the steering reaction $$2H_2+2CO=CH_4+CO_2 \quad (c)$$

With all fundamental reaction equations may further be combined the steering reaction $$4H_2+CO_2=CH_4+2H_2O \quad (d)$$

The above explanations have been developed with respect to octan because this compound is considered to be the most important representative of the benzine group and occupies the center of the aliphatic series of the benzine hydrocarbons. In the practical operation of the reactions, however, no chemically pure octan will be produced, because for instance the following combinations represent the same amounts of free energy:

$$2C_8H_{18}=C_7H_{16}+C_9H_{20}=C_6H_{14}+C_{10}H_{22}$$

Therefore these different products will be formed simultaneously.

In substantially the same manner as explained above for the production of aliphatic compounds also products may be produced which contain aromatic or hydroaromatic (alicyclic) compounds as the predominant constituents. In the production of these compounds a relatively higher percentage of carbon-monoxide is used than in the production of the corresponding aliphatic compounds, since these latter are richer is hydrogen. Strongly endothermic reactions in which either benzene or hexahydrobenzene is formed from methane and carbon oxides, may for instance be steered into regions which are thermodynamically favorable when operating under high pressure, i. e. into such regions in which the reactions, which actually proceed, possess free energies lying below $+5500$ g./cal.

This is again effected for instance by inserting, or causing to simultaneously proceed in the manner above described, the highly exothermic reaction $$3H_2+CO=CH_4+H_2O$$

Thus the production of benzene from methane and carbonmonoxide can for instance be assumed to proceed according to the following fundamental reaction equation $$3CH_4+3CO=C_6H_6+3H_2O$$

This reaction is very highly endothermic. Its free energy amounts for instance at 327° C. to $+14019$ g./cal., so that it could be carried through on an industrial scale, if at all, only with the greatest difficulty. According to my invention I now partly replace in this fundamental reaction equation the $CH_4$ by $H_2$ and $CO$ in the molecular proportion of 3:1, introducing into the said reaction equation that quantity of this mixture which according to Equation $a$ corresponds to the quantity of methane which shall be replaced in the fundamental reaction equation. I replace so much of the $CH_4$ by a mixture of 3 parts $H_2$ and 1 part $CO$ that the free energy of the resulting reaction does not exceed, at the operating temperature, $+5500$ g./cal. per mol of the hydrocarbon to be produced.

The following example illustrates in a somewhat different manner how to replace the methane by hydrogen and carbonmonoxide in the manner described above:

Fundamental reaction:

$$\underline{\quad\quad\quad 3CH_4+\quad 3CO=C_6H_6+\quad 3H_2O\quad\quad}$$
$$+n(3H_2+\quad\quad CO=\quad\quad\quad H_2O+CH_4)$$
Sum total: $3nH_2+(3-n)CH_4+(3+n)CO=C_6H_6+(3+n)H_2O$ Here $n$ may possess any integral or fractional value above zero, which value however in the preceding example, corresponding to the number of $CH_4$-molecules in the fundamental reaction equation, cannot exceed 3. For if $n$ becomes equal to 3, the entire methane is replaced and the fundamental reaction equation $$3CH_4+3CO=C_6H_6+3H_2O$$

is changed by the addition of $$3(3H_2+CO=H_2O+CH_4)$$

into the end reaction $$9H_2+6CO=C_6H_6+6H_2O$$

By varying $n$ any number of reaction equations may be formulated, which lie between these two equations and the free energies of which lie between the free energy of the fundamental reaction and that of the end reaction. Of these intermediate equations I elect for practical use one which at the reaction temperatures chosen possesses a free energy which is favorable in thermodynamical respect to be carried through under high pressure. In other words: by introducing the reaction equation:

$$3H_2 + CO = CH_4 + H_2O$$

(or a fraction or a multiple of the same) there result equations, with the aid of which the free energies may be varied at will within the limits determined by the free energies of the fundamental reaction equation and that of the end reaction equation.

In all these calculations one may of course also start from the exothermic end reaction. In this case the hydrogen and the carbon monoxide must be partly replaced by methane.

In a similar manner toluene may for instance be produced as main product. In this case the fundamental reaction equation $$11CH_4 + 10CO = 3C_7H_8 + 10H_2O$$

serves as highly endothermic fundamental reaction. At 327° C. the free energy of this reaction amounts to +50,865 g./cal., thus being, as in the preceding example, so strongly positive that the reaction is unfit for industrial use. In order to be enabled to successfully produce in spite thereof toluene from methane and carbonmonoxide, this reaction is steered by means of the steering reactions mentioned above into regions, in which the free energy reaches values which, according to the principles of thermodynamics, secure a technically favorable course of the reaction under high pressure. These regions lie below +5500 g./cal. per mol toluene produced.

The production of other aromatic compounds can be carried through in accordance with the same principles.

If preponderantly hydro-aromatic compounds, for instance hexahydrobenzene, shall be produced, one may start from the strongly endothermic fundamental reaction equation $$4CH_4 + 2CO = C_6H_{12} + 2H_2O$$

This equation has a large positive free energy, for instance at 327° C. +34,780 g./cal., being thus so strongly endothermic as not to be fit for practical operation. In order to nevertheless be enabled to produce hexahydrobenzene from methane and carbonmonoxide, this fundamental reaction equation is steered, for instance by replacing part of the methane by a mixture of carbonmonoxide and hydrogen in the molecular proportion of 3:1, into regions in which the free energies possess values, which render the formation of hexahydrobenzene under high pressure possible without difficulty.

The preceding fundamental reaction equation can be steered in the same manner with the aid of the other steering reactions above described.

The steering of the fundamental reactions with the aid of these steering reactions is effected in the same manner as in the preceding examples, i. e. for instance in applying the steering reaction (c) one replaces part of the methane, which occurs on the left hand side of the fundamental reaction equation (similarly as with the steering reaction (a)) by such a quantity of a mixture of hydrogen and carbonmonoxide—in which mixture however hydrogen and carbonmonoxide are now present in the molecular proportion of 2:2—that the molecular quantity of the methane forming according to the equation of the steering reaction (c) corresponds to the molecular quantity of methane to be replaced in the equation of the fundamental reaction.

In all cases the fundamental reaction equation is combined with the steering reaction equation in such proportion that there results a reaction equation, the free energy of which lies below +5500 g./cal., and the starting materials are caused to react with each other in the proportions indicated by the equation of the resulting reaction, by exposing them to corresponding conditions of temperature and pressure. Obviously by applying the above principle one is enabled to reach the region which is most favorable for the carrying through of the reactions under high pressures, in which the free energies lie below +5500 g./cal. and for instance between +5500 and −10,000 g./cal.

The following fundamental reaction equations can for instance be steered by means of one of the steering reactions mentioned above in accordance with the principle underlying this invention:

$$17CH_4 + 7CO = C_8H_{18} + 7H_2O$$
$$3CH_4 + 3CO = C_6H_6 + 3H_2O$$
$$4CH_4 + 2CO = C_6H_{12} + 2H_2O$$

$$9CH_4 + 14CO = 2C_8H_{18} + 7CO_2$$
$$3CH_4 + 18CO = 2C_6H_6 + 9CO_2$$
$$3CH_4 + 6CO = C_6H_{12} + 3CO_2$$

$$25CH_4 + 7CO_2 = 4C_8H_{18} + 14H_2O$$
$$15CH_4 + 9CO_2 = 4C_6H_6 + 18H_2O$$
$$9CH_4 + 3CO_2 = 2C_6H_{12} + 6H_2O$$

The preceding fundamental reaction equations represent primary types for the production of aliphatic, hydroaromatic and aromatic hydrocarbons, respectively. The invention is, however, not limited to these primary types. One may start in the same manner also from fundamental reaction equations according to which are formed homologs or derivatives of these primary types, such as toluene, xylene, methylcyclohexane or the like, and these fundamental reaction equations may be steered with the aid of one of the steering reactions mentioned above.

In a similar manner, as explained in the preceding examples with reference to the production of hexahydrobenzene from methane and carbonmonoxide, tetrahydrobenzene may for instance be produced as predominant product, by choosing different molecular proportions according to the fundamental reaction equation $$11CH_4 + 7CO = 3C_6H_{10} + 7H_2O$$

The production of other hydro-aromatic compounds can be carried through on the same principle.

From the free energies the well known equilibrium constant may be calculated, which forms a criterion for the calculation of the yield and of the pressures required.

Since the heat energy produced in the reaction can be controlled by means of a steering reaction, I am enabled to operate on a large scale under high pressure. Apart therefrom the high pressure does not only serve to increase the yield in accordance with the law of mass action, but also to activate (polarize) the methane molecule. The pressure employed in the process must be high enough to bring forth such an activation; this is, however, attained already at comparatively low pressures, if in the mixtures are present larger quantities of CO, the molecule of which is relatively unstable, i. e. relatively readily highly polarized and operates in the polarization of the methane by influence.

It will be useful in most cases to operate at high total pressures, for instance above 500 atmospheres and preferably above 1000 atmospheres. The working temperature may as a rule be chosen with advantage between 450° and 800° absolute (degrees Kelvin).

In the practical operation the reactions here in question can only be carried out with advantage, if the molecular quantity of $CH_4$ present in the starting gas mixture amounts to at least one fourth of the quantity of carbon oxides present.

The presence of $CH_4$ in the starting gas mixture also offers the advantage that the undesired formation of $CH_4$ is suppressed and prevented according to the law of mass action. The use of $CH_4$ instead of $H_2$ also leads to diminution of the proportion of carbon oxides in the starting gas mixture and thus also to a diminution of the highly exothermic formation of $H_2O$. This is particularly advantageous when operating under very high pressures, at which it is difficult, in consequence of the small specific volume, to carry away the heat in excess with sufficient speed.

As already mentioned above, as a rule the starting materials do not react with each other according to only one reacting equation, but several reactions will always proceed simultaneously, so that a mixture of various substances is obtained. According to the quantities of $CH_4$, CO or $CO_2$ used, i. e. in accordance with the fundamental reaction equations used in practical operation aliphatic or aromatic or hydroaromatic compounds will predominate in the resultant product.

The starting materials need not be chemically pure; inert gases which will not participate in the reaction may be present in the reaction mixture. For instance natural gas or certain industrial gases containing hydrogen, carbon oxides and/or methane may be used as starting material, which may previously have been subjected to a thermic treatment or a conversion according to well known methods.

For the purpose of accelerating the reactions, particularly when operating at not too high pressures, catalysts may be used, which are produced and employed in a manner well known to a person skilled in the art. If catalysts are used having a selective efficacy, i. e. which accelerate with different effect the formation, from the same starting materials, of different compounds, the composition of the end products may be influenced according to well known principles. In such case the above explanations apply with equal force to the fundamental reaction equations, which shall preferably be accelerated by the respective catalyst.

In the practical operation of my invention I may for instance proceed as follows:

Example 1

Through a contact tube filled with an iron-molybdenum-catalyst are continuously forced, after the reduction of the catalyst, 1000 cubic meters per hour of a gas mixture having the following compositions: 33% (by volume) $H_2$, 31% CO and 31% $CH_4$. The pressure is maintained at 850 atmospheres above normal, the temperature at 250° C. There result 315 kgs. hydrocarbons, consisting mainly of octan, and 195 kgs. water.

In the main the reaction $$5H_2 + 4CO + 4CH_4 = 4H_2O + C_8H_{18}$$

(free energy: −849 g./cal.)

has occurred. The steering reaction $$3H_2 + CO = CH_4 + H_2O$$

(free energy: −21,019 g./cal.)

was used to change the strongly endothermic fundamental reaction $$17CH_4 + 7CO = 3C_8H_{18} + 7H_2O$$

(free energy: + 104,774 g./cal.)

into the reaction $$12CH_4 + 12CO + 15H_2 = 3C_8H_{18} + 12H_2O$$

(free energy: −21,019 g./cal.)

which is equal to $$4CH_4 + 4CO + 5H_2 = C_8H_{18} + 4H_2O$$

Example 2

1000 cubic meters of a gas mixture consisting of 33.3% (by volume) $H_2$, 33.3% CO and 33.4% $CH_4$ are passed per hour through a contact tube containing reduced molybdenum-iron, the pressure being maintained at 800 atmospheres above normal, the temperature at 225–230° C. There are formed per hour 380 kgs. hydrocarbons, consisting mainly of cyclohexan, and 240 kgs. water.

Here the reaction $$3H_2 + 3CH_4 + 3CO = 3H_2O + C_6H_{12}$$

has been carried through, the free energy of which at the working temperature amounts to +2698 g./cal. per 1 mol $C_6H_{12}$. The reaction results from the fundamental reaction equation $$4CH_4 + 2CO = 2H_2O + C_6H_{12}$$

(the free energy of which at the working temperature amounts to +25,178 g./cal.) by replacing therein exactly 1 $CH_4$ by $3H_2 + 1CO$ in accordance with the steering reaction $$3H_2 + CO = CH_4 + H_2O$$

the free energy of which at the working temperature amounts to −22,480 g./cal. per 1 mol $CH_4$.

Example 3

Through a contact tube charged with the same kind of catalyst are continuously forced 1000 cubic meters per hour of the following gas mixture: 33.3% (by volume) $H_2$, 22.2% $CH_4$ and 44.5% CO. The pressure is maintained at 890 atmospheres above normal, the temperature at 370–380° C. There are formed per hour 212 kgs. aromatic hydrocarbons, consisting mainly of benzene, and about 200 kgs. water.

Here the reaction $$3H_2 + 2CH_4 + 4CO = C_6H_6 + 4H_2O$$

has been carried through, which at the temperature mentioned has a free energy of +3295 g./cal. per mol benzene. The fundamental reaction equation used:

$$3CH_4 + 3CO = 3H_2O + C_6H_6$$

has at 370–380° C. the free energy +16,917 g./cal. per mol benzene and is steered by the steering reaction (a)

$$3H_2 + CO = H_2O + CH_4$$

(free energy: − 13,622 g./cal.)

into the above-mentioned area which is thermodynamically favorable with a view to the conditions of operation employed.

Example 4

Through a contact tube charged with the same catalyst are forced 1000 cubic meters per hour of a gas mixture composed of 41.7% (by volume) $H_2$, 16.7% $CH_4$ and 41.6% CO. The pressure is maintained at 1450 atmospheres above normal, the temperature at 370–380° C. There are formed per hour 273 kgs. aromatic hydrocarbons, consisting mainly of toluene, and about 270 kgs. water. The formation of the toluene took place according to the equation $$5H_2 + 2CH_4 + 5CO = C_7H_8 + 5H_2O$$

(free energy: −2061 g./cal.)

In the endothermic fundamental reaction $$11CH_4 + 10CO = 10H_2O + 3C_7H_8$$

(free energy: +61,927 g./cal.)

steered by the steering reaction (a)

$$3H_2 + CO = CH_4 + H_2O$$

(free energy: −13,622 g./cal.)

5 mols $CH_4$ have been replaced by a mixture of $5CO + 15H_2$, so that there results the reaction $$15H_2 + 6CH_4 + 15CO = 15H_2O + 3C_7H_8$$

(free energy: −6184 g./cal.)

equal to $$5H_2 + 2CH_4 + 5CO = 5H_2O + C_7H_8$$

to which correspond the percentages of starting materials stated above.

Example 5

Through a contact tube charged with the same catalyst are forced 1000 cubic meters per hour of a gas mixture consisting of 22.2% (by volume) $CH_4$ and 77.8% CO. The pressure is maintained at 1300 atmospheres above normal, the temperature at 370–380° C. There are formed per hour 329 kgs. hydrocarbons, mainly benzene, 76 kgs. water and 556 kgs. $CO_2$.

Here the reaction $$2CH_4 + 7CO = C_6H_6 + H_2O + 3CO_2$$

played the main role, the free energy of which at the working temperature amounts to −6768 g./cal. per mol benzene produced. The fundamental reaction equation $$3CH_4 + 3CO = C_6H_6 + 3H_2O$$

(free energy: +16,917 g./cal.)

was changed by the steering reaction (d)

$$2H_2O + 4CO = 3CO_2 + CH_4$$

(free energy: −23,685 g./cal.)

into the resulting reaction equation given above.

Example 6

Through a contact tube charged with the same catalyst were forced 1000 cubic meters per hour of a gas mixture consisting of 16.7% (by volume) $H_2$, 16.7% $CH_4$ and 66.6% CO. The pressure was maintained at 1270 atmospheres above normal, the temperature at 370–380° C. There were formed per hour 259 kgs. cyclic hydrocarbons, preponderantly cyclohexan, and 543 kgs. $CO_2$.

Mainly the conversion $$2H_2 + 8CO + 2CH_4 = C_6H_{12} + 4CO_2$$

took place, the free energy of which under the working conditions amounts to −1057 g./cal. The fundamental reaction $$6CO + 3CH_4 = C_6H_{12} + 3CO_2$$

which cannot be carried through practically under the working conditions mentioned in consequence of its having a free energy of +15,919 g./cal. per mol cyclohexan, was steered by the steering reaction (b)

$$2H_2 + 2CO = CO_2 + CH_4$$

(free energy: −16,976 g./cal.)

into the thermodynamically favorable area of the reaction actually carried through.

Various changes may be made in the details disclosed in the foregoing specification without departing from the invention or sacrificing the advantage thereof.

I claim:

1. The process of producing mixtures of hydrocarbons, which comprises subjecting a composition consisting of methane, at least one member of the group constituted by carbon monoxide and carbon dioxide and at least one member of the group constituted by hydrogen and water at a temperature, which ranges approximately between 225 and 380° C. and is too low to cause a substantial proportion of the methane to be cracked, to a pressure of more than 500 atmospheres and which suffices to cause a polarization of the methane present, the molecular proportions of the components of said composition being so chosen that the molecular quantity of the methane present in the starting gas mixture amounts to at least one fourth of the molecular quantity of the carbon oxides present and that the free energy of the resulting reaction has a value which does not exceed +5500 gram calories per mol of the product to be produced, calculated according to the notation adopted by Lewis and Randall.

2. The process of claim 1, in which the operation is carried through under a total pressure of at least 1000 atmospheres.

3. The process of claim 1, in which the operation is carried through at temperatures ranging between 450° and 800° absolute (degrees Kelvin).

4. The process of claim 1, in which the operation is carried through at temperatures ranging between 450° and 800° absolute (degrees Kelvin) and under a total pressure of at least 1000 atmospheres.

EULAMPIU SLATINEANU.